US010827364B2

(12) United States Patent
Shi et al.

(10) Patent No.: US 10,827,364 B2
(45) Date of Patent: Nov. 3, 2020

(54) PHASED ARRAY ANTENNA SYSTEM FOR FAST BEAM SEARCHING

(71) Applicant: Futurewei Technologies, Inc., Plano, TX (US)

(72) Inventors: Ping Shi, San Diego, CA (US); Xiaoyin He, San Diego, CA (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 249 days.

(21) Appl. No.: 15/896,993

(22) Filed: Feb. 14, 2018

(65) Prior Publication Data

US 2019/0253899 A1 Aug. 15, 2019

(51) Int. Cl.
| | |
|---|---|
| *H04W 16/28* | (2009.01) |
| *H01Q 21/22* | (2006.01) |
| *H01Q 3/34* | (2006.01) |
| *H01Q 1/24* | (2006.01) |
| *H04W 72/08* | (2009.01) |
| *H04W 72/02* | (2009.01) |
| *H04W 72/04* | (2009.01) |

(Continued)

(52) U.S. Cl.
CPC ............ *H04W 16/28* (2013.01); *H01Q 1/246* (2013.01); *H01Q 3/34* (2013.01); *H01Q 21/22* (2013.01); *H04W 48/16* (2013.01); *H04W 56/001* (2013.01); *H04W 72/02* (2013.01); *H04W 72/046* (2013.01); *H04W 72/085* (2013.01)

(58) Field of Classification Search
CPC ... H04W 16/28; H04W 48/16; H04W 56/001; H04W 72/02; H04W 72/046; H04W 72/085; H01Q 1/246; H01Q 3/34; H01Q 21/22; H01Q 3/38
See application file for complete search history.

(56) References Cited

U.S. PATENT DOCUMENTS

| | | | | |
|---|---|---|---|---|
| 7,633,442 B2 * | 12/2009 | Chiang | .................... | H01Q 3/24 342/432 |
| 10,299,175 B2 * | 5/2019 | Weber | ............... | H04W 36/0072 |

(Continued)

FOREIGN PATENT DOCUMENTS

| | | |
|---|---|---|
| CN | 104935366 A | 9/2015 |
| CN | 105959966 A | 9/2016 |
| CN | 106159461 A | 11/2016 |

OTHER PUBLICATIONS

Cohen et al., "A CMOS Bidirectional 32-Element Phased-Array Transceiver at 60 GHz with LTCC Antenna", IEEE Transactions on Microwave Theory and Techniques, vol. 61, No. 3, 17 pages, Mar. 2013.

(Continued)

*Primary Examiner* — Kibrom T Hailu
(74) *Attorney, Agent, or Firm* — Vierra Magen Marcus LLP

(57) ABSTRACT

The disclosure relates to technology for beam searching. Beam searching includes forming an omnidirectional radiation pattern by a group of antenna elements including one antenna element from each of one or more phased array antennas. In response to detection of beams from a transmitter, searching for one antenna element in the group according to a combined signal strength of each antenna element in the group; and enabling a phased array antenna with the one antenna element to align with the beams.

22 Claims, 9 Drawing Sheets

(51) Int. Cl.
*H04W 48/16* (2009.01)
*H04W 56/00* (2009.01)

(56) References Cited

U.S. PATENT DOCUMENTS

| | | |
|---|---|---|
| 2006/0111056 A1* | 5/2006 | Dutta .................. H01Q 3/24 |
| | | 455/103 |
| 2007/0123263 A1 | 5/2007 | Smith et al. |
| 2007/0135063 A1* | 6/2007 | Zangi .................. H01Q 3/34 |
| | | 455/101 |
| 2013/0010723 A1 | 1/2013 | Ouchi et al. |
| 2013/0157578 A1* | 6/2013 | Nanda .................. H01Q 1/246 |
| | | 455/63.4 |
| 2014/0010178 A1 | 1/2014 | Yu et al. |
| 2016/0150591 A1* | 5/2016 | Tarighat Mehrabani ................ |
| | | H04W 52/38 |
| | | 370/329 |
| 2016/0164174 A1* | 6/2016 | Kullstam .................. H01Q 3/34 |
| | | 342/368 |
| 2016/0183233 A1 | 6/2016 | Park |
| 2016/0261308 A1* | 9/2016 | Khojastepour .......... H04B 3/20 |
| 2016/0373938 A1* | 12/2016 | Chen .................. H04B 7/0695 |
| 2017/0074962 A1* | 3/2017 | Badawy .................. G01S 3/38 |
| 2017/0194706 A1 | 7/2017 | Lee et al. |
| 2017/0331670 A1 | 11/2017 | Parkvall et al. |
| 2018/0048382 A1* | 2/2018 | DiNallo .................. H01Q 3/34 |
| 2018/0092064 A1 | 3/2018 | Ryu et al. |
| 2018/0110066 A1 | 4/2018 | Luo et al. |
| 2018/0131434 A1 | 5/2018 | Islam et al. |
| 2018/0138962 A1 | 5/2018 | Islam et al. |
| 2018/0220448 A1 | 8/2018 | Akkarakaran et al. |
| 2018/0262258 A1* | 9/2018 | Kumagai ............... H04B 7/088 |
| 2018/0278310 A1 | 9/2018 | Lee et al. |
| 2018/0288756 A1 | 10/2018 | Xia et al. |
| 2018/0302889 A1 | 10/2018 | Guo et al. |
| 2018/0332625 A1 | 11/2018 | Tsai et al. |
| 2018/0368005 A1 | 12/2018 | Fukui et al. |
| 2018/0368126 A1 | 12/2018 | Islam et al. |
| 2019/0021071 A1 | 1/2019 | Islam et al. |
| 2019/0037604 A1 | 1/2019 | Akkarakaran et al. |
| 2019/0053071 A1 | 2/2019 | Ly et al. |
| 2019/0053193 A1 | 2/2019 | Park et al. |

OTHER PUBLICATIONS

IEEE, Part 11: "Wireless LAN Medium Access Control (MAC) and Physical Layer (PHY) Specifications, Amendment 3: Enhancements for Very High Throughput in the 60 GHz Band", IEEE Std 802.11 ad-2012, 628 pages, Dec. 28, 2012.
Notice of Allowance dated Mar. 26, 2019, in U.S. Appl. No. 15/796,449.
International Search Report dated May 7, 2019, in PCT Patent Application No. PCT/CN2019/074702, 9 pages.
Office Action dated Dec. 21, 2018 in U.S. Appl. No. 15/796,449.
U.S. Appl. No. 15/847,703—Office Action dated Mar. 12, 2020, 23 pages.
U.S. Appl. No. 15/847,703—Response to Office Action dated Jun. 10, 2020.
U.S. Appl. No. 16/890,815—U.S. Patent Application filed Jun. 2, 2020.

* cited by examiner

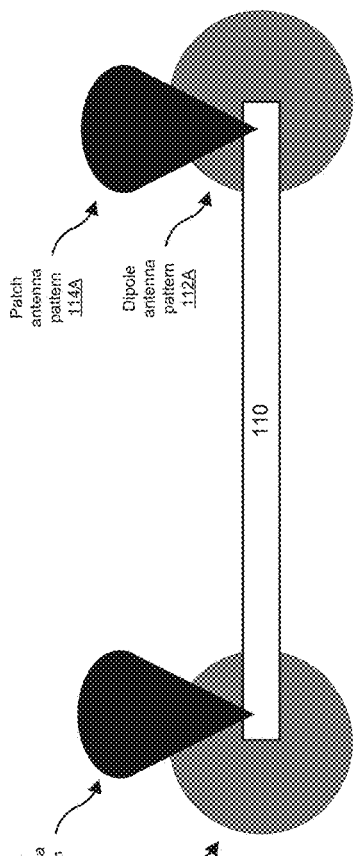
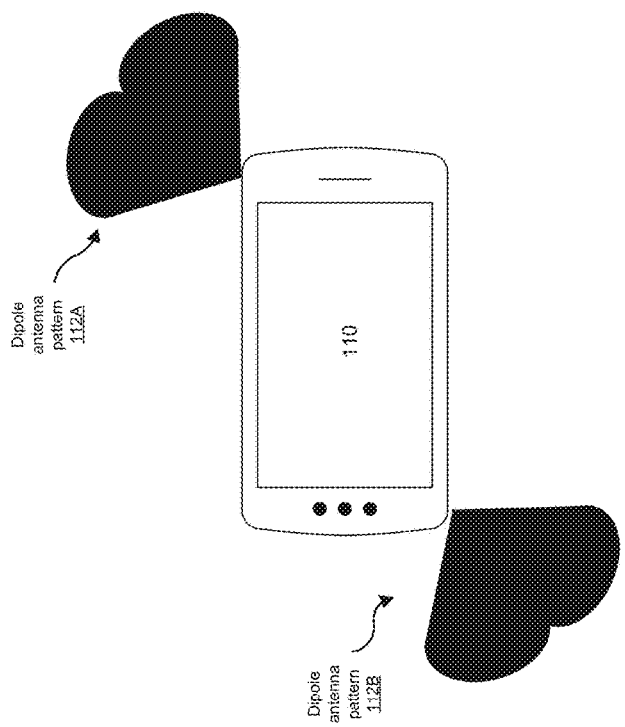
FIG. 6A
FIG. 6B

PHASED ARRAY ANTENNA SYSTEM FOR FAST BEAM SEARCHING

FIELD

The disclosure generally relates to beam searching, and in particular, to beam searching among multiple phased array antennas using a combination of single antenna elements from multiple phased array antennas.

BACKGROUND

As the demand for capacity in mobile broadband communications increases drastically every year, wireless communication systems are increasing their capability of handling mobile traffic. In next generation systems, such as fifth generation (5G) technologies, advanced communications, such as millimeter-wave (mm-wave) communications, with potential multigigabit-per-second data rates are candidate technologies to increase overall capacity and transmission speeds. Highly directional beamforming antennas are necessary at both the base station (BS) and mobile station (MS) to compensate for the high attenuation in the mm-wave frequency band and to extend its transmission range. However, when using mm-wave communications, it becomes increasingly important to find procedures that will encourage fast beam searching and alignment.

BRIEF SUMMARY

According to one aspect of the present disclosure, there is provided a method of beam searching, comprising forming an omnidirectional radiation pattern by a group of antenna elements including a one antenna element from each of one or more phased array antennas; in response to detection of beams from a transmitter, searching for one antenna element in the group according to a combined signal strength of each antenna element in the group; and enabling a phased array antenna with the one antenna element to align with the beams.

Optionally, in any of the preceding aspects, wherein the search is based on a binary search operation.

Optionally, in any of the preceding aspects, the binary search operation comprises recording a first signal strength with the group of antenna elements; dividing the group of antenna elements into two sets of antenna elements and comparing the first signal strength with the second signal strength to determine one of two sets, wherein the determined set contains one element antenna.

Optionally, in any of the preceding aspects, the binary search operation further comprises selecting a first set of the two sets when the signal strengths are equal; selecting a second set of the two sets when the second signal strength is lower than the first signal strength; and enabling the phased array antenna with the one antenna element to align with the beams when one of the antenna elements remains in one of the first and second sets.

Optionally, in any of the preceding aspects, the first set includes half of the antenna elements of the one or more phased array antennas, and the second set includes the other half of the antenna elements of one or more phased array antennas.

Optionally, in any of the preceding aspects, the method further comprising initiating a search operation to find available transmitters and communication channels and a synchronization operation to synchronize with the transmitter; and selecting the one element antenna from each of the one or more phased arrays.

Optionally, in any of the preceding aspects, the method further comprising, after searching for the one antenna element in the two equal sets, activating each of the antenna elements in the phased array with the one antenna element.

Optionally, in any of the preceding aspects, the one or more phased array antennas have a searching time of log 2(N), where N is a number of the one or more phased array antennas.

According to another aspect of the present disclosure, there is provided a device for beam searching, comprising one or more phased array antennas forming an omnidirectional radiation pattern by a group of antenna elements including one antenna element from each of one or more phased array antennas; a controller controlling the one or more phased array antennas to: in response to detection of beams from a transmitter, search for one antenna element in the group according to a combined signal strength in the group, and enable a phased array antenna with the one antenna element to align with the transmitter beams.

According to one aspect of the present disclosure, there is provided a non-transitory computer-readable medium storing computer instructions for beam searching, that when executed by one or more processors, cause the one or more processors to perform the steps of forming an omnidirectional radiation pattern by a group of antenna elements including one antenna element from each of one or more phased array antennas; in response to detection of beams from a transmitter, searching for one antenna element in the group according to a combined signal strength of each antenna element in the group; and enabling a phased array antenna with the one antenna element to align with the beams.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures for which like references indicate elements.

FIGS. 6A and 6B illustrate an example user device with omnidirectional and directional antennas.

DETAILED DESCRIPTION

The disclosure relates to technology for beam searching using a combination of single element antennas from multiple phased array antennas to form an omnidirectional radiation pattern. The term omnidirectional radiation pattern refers generally to an antenna pattern that is not directional (gain is not limited to a specific direction), such that the antenna has acceptable gain (and able to transmit and receive signals) over a nearly entire spherical space (omnidirectional).

The disclosed technology addresses challenges in fast beam searching and alignment when using mm-wave communication systems. To overcome such challenges, an omnidirectional antenna array (uniform array) is formed by combining antenna elements from non-overlapping phased array antennas. For non-overlapping phased array antennas, each of the phased array antenna covers a specific range of azimuth/elevation angles in spherical space, where the antenna pattern from one phased array antenna does not (substantially) overlap antenna patterns from other arrays. The combination of antenna elements is used to conduct an initial search of the best beam from the transmitter, followed by a binary search of the antenna elements to identify the corresponding phased array antenna from the receiver. Employing the omnidirectional antenna array using single antenna elements from multiple array antennas and the binary search for antenna arrays will expedite the searching process to thereby reduce searching complexity from N to log 2(N), where N is the number of phased array antennas at the receiver.

It is understood that the present embodiments of the disclosure may be implemented in many different forms and that claims scopes should not be construed as being limited to the embodiments set forth herein. Rather, these embodiments are provided so that this disclosure will be thorough and complete and will fully convey the inventive embodiment concepts to those skilled in the art. Indeed, the disclosure is intended to cover alternatives, modifications and equivalents of these embodiments, which are included within the scope and spirit of the disclosure as defined by the appended claims. Furthermore, in the following detailed description of the present embodiments of the disclosure, numerous specific details are set forth in order to provide a thorough understanding. However, it will be clear to those of ordinary skill in the art that the present embodiments of the disclosure may be practiced without such specific details.

Figure 1:
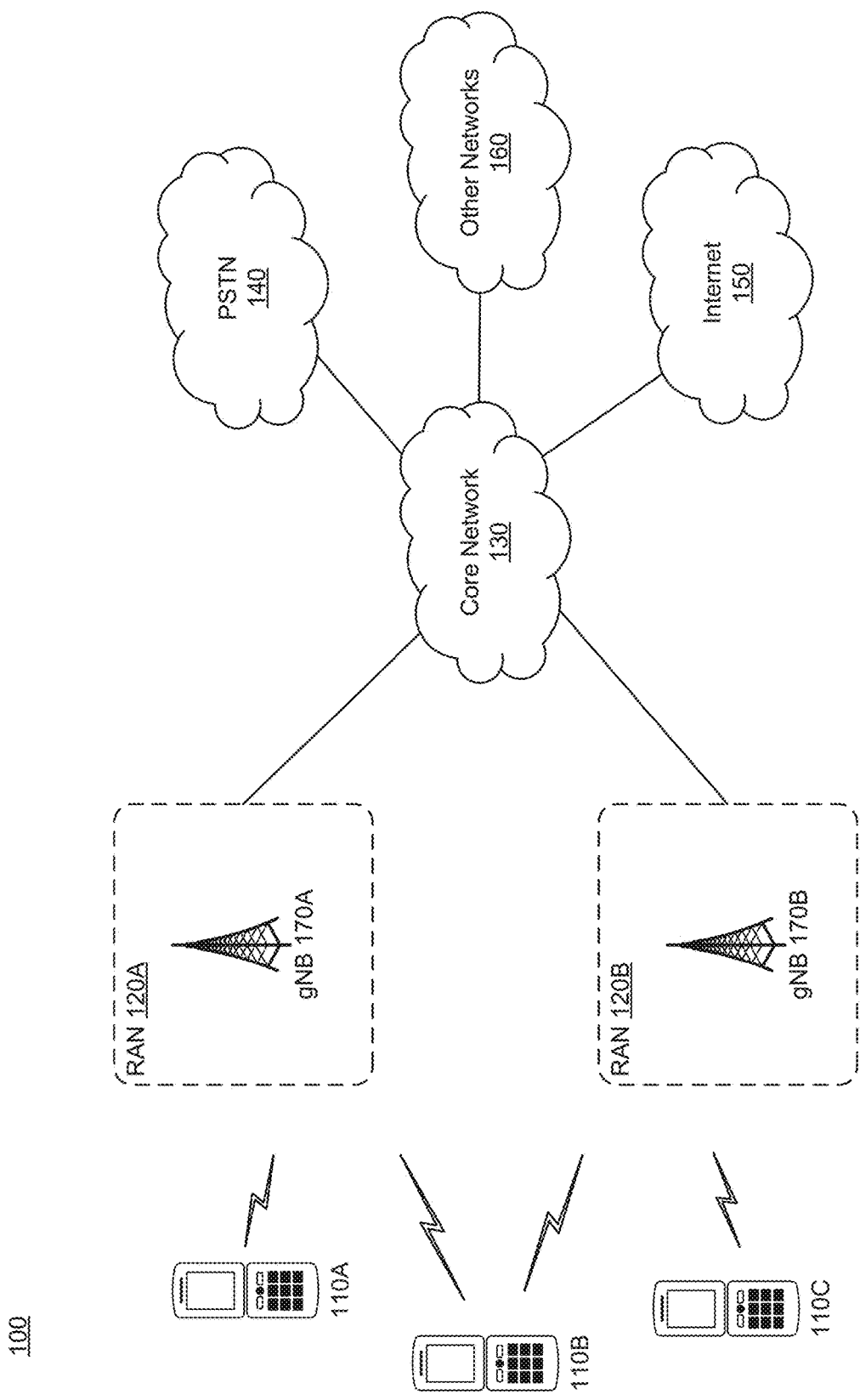
FIG. 1 illustrates a wireless network for communicating data.

FIG. 1 illustrates a wireless network for communicating data. The communication system 100 includes, for example, user equipment 110A-110C, radio access networks (RANs) 120A-120B, a core network 130, a public switched telephone network (PSTN) 140, the Internet 150, and other networks 160. Additional or alternative networks include private and public data-packet networks including corporate intranets. While certain numbers of these components or elements are shown in the figure, any number of these components or elements may be included in the system 100.

In one embodiment, the wireless network may be a fifth generation (5G) network including at least one 5G base station which employs orthogonal frequency-division multiplexing (OFDM) and/or non-OFDM and a transmission time interval (TTI) shorter than 1 ms (e.g. 100 or 200 microseconds), to communicate with the communication devices. In general, a base station may also be used to refer any of the eNB and the 5G BS (gNB). In addition, the network may further include a network server for processing information received from the communication devices via the at least one eNB or gNB.

System 100 enables multiple wireless users to transmit and receive data and other content. The system 100 may implement one or more channel access methods, such as but not limited to code division multiple access (CDMA), time division multiple access (TDMA), frequency division multiple access (FDMA), orthogonal FDMA (OFDMA), or single-carrier FDMA (SC-FDMA).

The user equipment (UE) 110A-110C are configured to operate and/or communicate in the system 100. For example, the user equipment 110A-110C are configured to transmit and/or receive wireless signals or wired signals. Each user equipment 110A-110C represents any suitable end user device and may include such devices (or may be referred to) as a user equipment/device, wireless transmit/receive unit (UE), mobile station, fixed or mobile subscriber unit, pager, cellular telephone, personal digital assistant (PDA), smartphone, laptop, computer, touchpad, wireless sensor, wearable devices or consumer electronics device.

In the depicted embodiment, the RANs 120A-120B include one or more base stations 170A, 170B (collectively, base stations 170), respectively. Each of the base stations 170 is configured to wirelessly interface with one or more of the UEs 110A, 110B, 110C to enable access to the core network 130, the PSTN 140, the Internet 150, and/or the other networks 160. For example, the base stations (BSs) 170 may include one or more of several well-known devices, such as a base transceiver station (BTS), a Node-B (NodeB), an evolved NodeB (eNB), a next (fifth) generation (5G) NodeB (gNB), a Home NodeB, a Home eNodeB, a site controller, an access point (AP), or a wireless router, or a server, router, switch, or other processing entity with a wired or wireless network.

In one embodiment, the base station 170A forms part of the RAN 120A, which may include other base stations, elements, and/or devices. Similarly, the base station 170B forms part of the RAN 120B, which may include other base stations, elements, and/or devices. Each of the base stations 170 operates to transmit and/or receive wireless signals within a particular geographic region or area, sometimes referred to as a "cell." In some embodiments, multiple-input multiple-output (MIMO) technology may be employed having multiple transceivers for each cell.

The base stations 170 communicate with one or more of the user equipment 110A-110C over one or more air interfaces (not shown) using wireless communication links. The air interfaces may utilize any suitable radio access technology.

It is contemplated that the system 100 may use multiple channel access functionality, including for example schemes in which the base stations 170 and user equipment 110A-110C are configured to implement the Long Term Evolution wireless communication standard (LTE), LTE Advanced (LTE-A), and/or LTE Multimedia Broadcast Multicast Service (MBMS). In other embodiments, the base stations 170 and user equipment 110A-110C are configured to implement UMTS, HSPA, or HSPA+ standards and protocols. Of course, other multiple access schemes and wireless protocols may be utilized.

The RANs 120A-120B are in communication with the core network 130 to provide the user equipment 110A-110C with voice, data, application, Voice over Internet Protocol (VoIP), or other services. As appreciated, the RANs 120A-120B and/or the core network 130 may be in direct or indirect communication with one or more other RANs (not shown). The core network 130 may also serve as a gateway access for other networks (such as PSTN 140, Internet 150, and other networks 160). In addition, some or all of the user equipment 110A-110C may include functionality for communicating with different wireless networks over different wireless links using different wireless technologies and/or protocols.

The RANs 120A-120B may also include millimeter and/or microwave access points (APs). The APs may be part of the base stations 170 or may be located remote from the base stations 170. The APs may include, but are not limited to, a connection point (an mmW CP) or a base station 170 capable of mmW communication (e.g., a mmW base station). The mmW APs may transmit and receive signals in a frequency range, for example, from 24 GHz to 100 GHz, but are not required to operate throughout this range. As used herein, the term base station is used to refer to a base station and/or a wireless access point.

Although FIG. 1 illustrates one example of a communication system, various changes may be made to FIG. 1. For example, the communication system 100 could include any number of user equipment, base stations, networks, or other components in any suitable configuration. It is also appreciated that the term user equipment may refer to any type of wireless device communicating with a radio network node in a cellular or mobile communication system. Non-limiting examples of user equipment are a target device, device-to-device (D2D) user equipment, machine type user equipment or user equipment capable of machine-to-machine (M2M) communication, laptops, PDA, iPad, Tablet, mobile terminals, smart phones, laptop embedded equipped (LEE), laptop mounted equipment (LME) and USB dongles.

Figure 2:
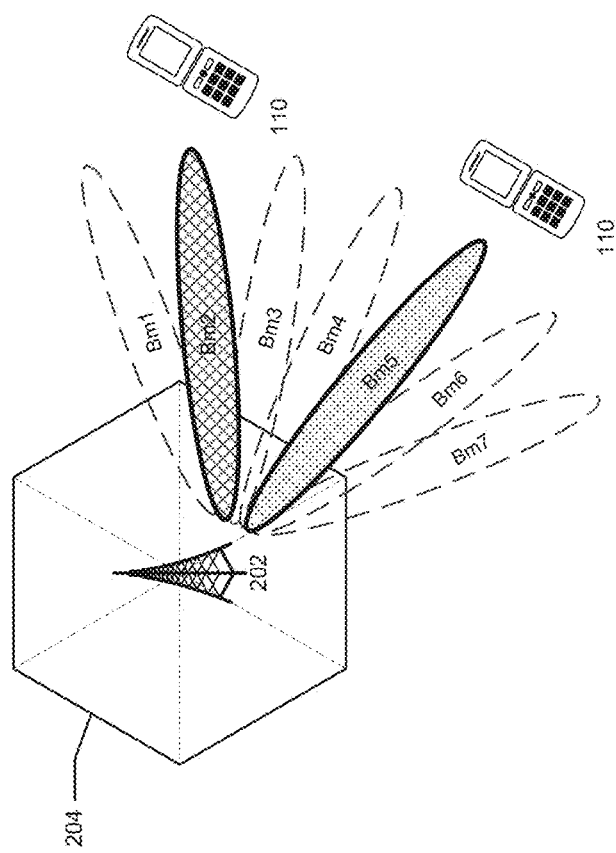
FIG. 2 illustrates a base station with transmitting and receiving beams according to an example embodiment

FIG. 2 illustrates a base station with transmitting and receiving beams according to an example embodiment. The base station 202 manages a cell 204 divided into one or more sectors as its service coverage area and forms multiple transmit/receive (Tx/Rx) beams BM1-BM7 using beamforming schemes, such as digital beamforming (e.g., Transmit (Tx) pre-Inverse Fast Fourier Transform (pre-IFFT) beamforming/Receive (Rx) post-Fast Fourier Transform (post-FFT) beamforming), analog beamforming (e.g., Tx post-IFFT beamforming/Rx pre-FFT beamforming), or a combination thereof. The base station 202 transmits the beamformed signals by sweeping them simultaneously or successively, for example, beginning with beam BM1 and ending with BM7, and is described in more detail with reference to FIGS. 4A and 4B.

The base station 202 may include, or may be associated with, one or more antennas (not shown) configured for transmitting and/or receiving wireless communication signals, blocks, frames, transmission streams, packets, messages and/or data. In one embodiment, the antennas may include an antenna array configured for generating one or more directional beams, for example, for communicating over one or more beamformed links.

In other embodiments, the antennas may include any other antenna configurations, structure and/or arrangement of one or more antenna elements, components, units, assemblies and/or arrays. For example, the antennas may include a phased array antenna, a single element antenna, a multiple element antenna, a set of switched beam antennas, and/or the like. The antenna array may include one or more antenna elements, which may be configured, for example, for creating a highly directional antenna pattern. The antenna elements may be placed, for example, in an array, e.g., a two-dimensional array, of a predefined geometry or may be configured to form one or more highly directive antenna patterns or beams, which may be steered by setting appropriate signal phases at the antenna elements and/or by baseband processing.

In still another embodiment, a dual polarized element may be employed. Here, a single element of an antenna array may contain multiple polarized antennas, or provide dual polarized radiated fields through different feeds within the same antenna structure. Multiple elements may be combined together to form an antenna array. The polarized antennas may be radially spaced. For example, two polarized antennas may be arranged perpendicularly, corresponding to a horizontally polarized antenna and a vertically polarized antenna.

In some embodiments, base station 202 may be configured to control the antenna array to generate and steer one or more beams to be directed to one or more other devices, e.g., UE 110.

In other embodiments, the base station 202 and UE 110 may utilize the mm-wave communication band to provide wireless connectivity for a relatively large coverage area.

User equipment (UE), such as user equipment 110A-110C (FIG. 1), located within the cell of the base station 202 may be configured to receive signals omnidirectionally without supporting Rx beamforming, receive signals while supporting Rx beamforming by using one beamforming pattern each time, or receive signals while supporting Rx beamforming by simultaneously using a plurality of beamforming patterns in different directions.

If the user equipment 110A-110C does not support Rx beamforming, the user equipment 110A-110C measures the channel quality using a reference signal (RS) in each transmission beam and reports the measurements to the base station 202. The station 202 selects the best beam for the user equipment 110A-110C from among a plurality of Tx beams. If the user equipment 110A-110C is configured to support Rx beamforming, the user equipment 110A-110C measures the channel qualities of multiple Tx beams received from the base station 202 for each reception beam pattern and reports a total or some high-ranked measurements of all Tx-Rx beam pairs to the base station 202. The base station 202 may allocate an appropriate Tx beam to the user equipment 110A-110C. If the user equipment 110A-110C is capable of receiving a plurality of Tx beams from the base station 202 or supporting a plurality of base station Tx-user equipment Rx beam pairs, the base station 202 may select a beam, taking into account diversity transmission through repeated transmission or simultaneous transmission.

Figure 3:
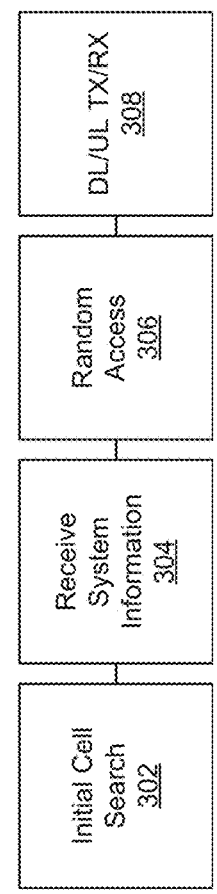
FIG. 3 illustrates physical channels and transmitting signals on the physical channels in accordance with FIG. 2.

FIG. 3 illustrates physical channels and transmitting signals on the physical channels in accordance with FIG. 2. When user equipment 110A-110C (FIG. 1) is powered on or enters a new cell, such as cell 204 (FIG. 2), the user equipment performs an initial cell search 302. The initial cell search 302 involves acquisition of synchronization to a base station, such as gNB 202. Specifically, the user equipment synchronizes its timing to the gNB and acquires a cell Identifier (ID) and other information by receiving a Primary Synchronization Signal (PSS) and a Secondary Synchronization Signal (SSS) from the gNB 202. Subsequently, the user equipment may acquire information broadcast in the cell by receiving a Physical Broadcast Channel (PBCH) from the gNB 202. During the initial cell search, the user equipment may monitor a downlink (DL) channel state by receiving a downlink reference Signal (RS).

After the initial cell search, the user equipment 110A-110C may acquire detailed system information at 304 by receiving a Physical Downlink Control Channel (PDCCH).

If the user equipment 110A-110C initially accesses the gNB 202 or has no radio resources for signal transmission to the gNB 202, the user equipment 110A-110C may perform a random access procedure at 306 with the gNB 202. During the random access procedure 306, the user equipment 110A-110C acquires uplink timing alignment with the gNB 202.

Upon completion of the above process, the user equipment 110A-110C may receive a PDCCH and/or a PDSCH from the gNB 202 and transmit a Physical Uplink Shared Channel (PUSCH) and/or a PUCCH to the gNB 202, which is a general DL and UL signal transmission procedure at 308. Specifically, the user equipment 110A-110C receives Downlink Control Information (DCI) on a PDCCH. The DCI includes, for example, control information such as resource allocation information for the user equipment 110A-110C.

Control information that the user equipment 110A-110C transmits to the gNB 202 on the uplink (UL) channel or receives from the gNB 202 on the DL channel includes a DL/UL ACKnowledgment/Negative ACKnowledgment (ACK/NACK) signal, a Channel Quality Indicator (CQI), a Precoding Matrix Index (PMI), a Rank Indicator (RI), etc. The control information, such as a CQI, a PMI, an RI, etc., may be transmitted on a PUSCH and/or a PUCCH.

Figure 4:
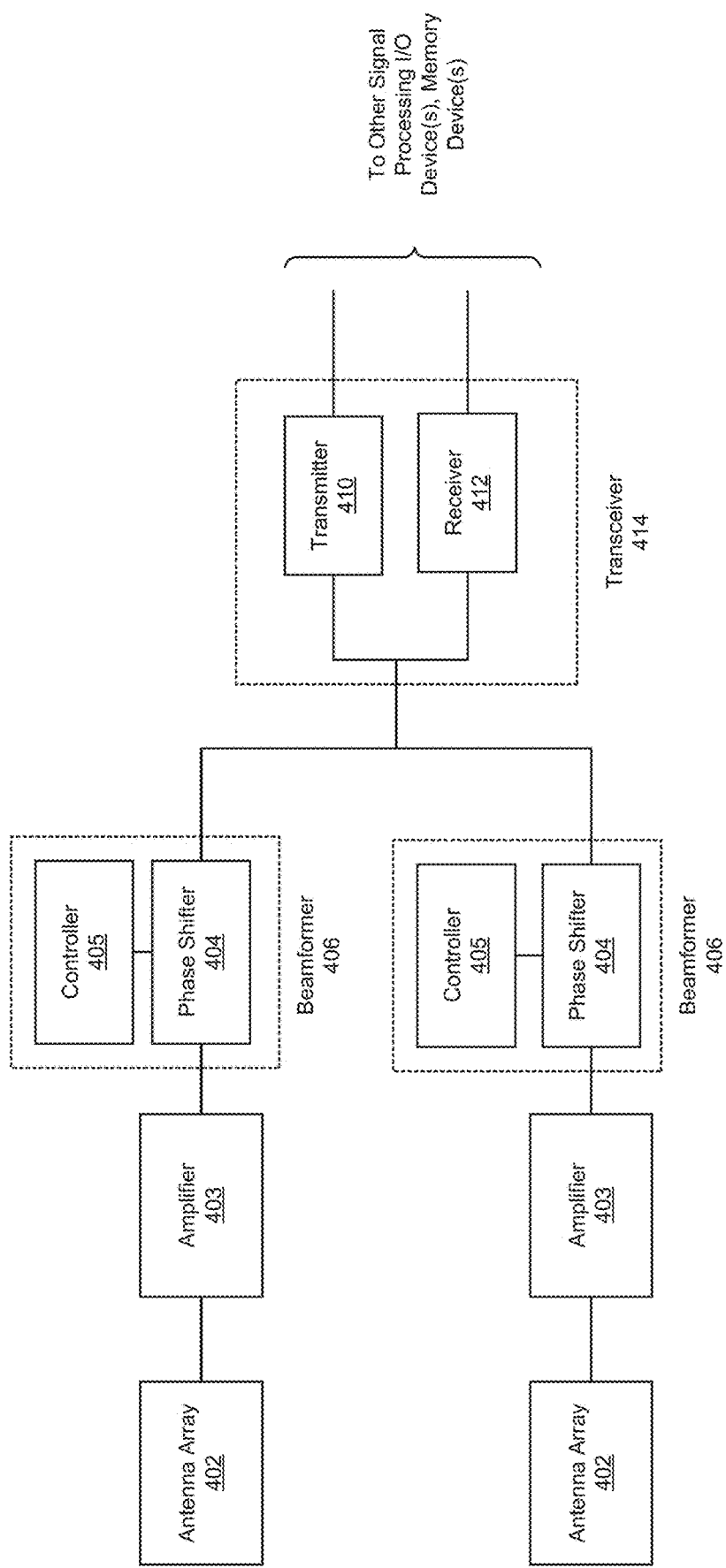
FIG. 4 is an example diagram of communication equipment.

FIG. 4 is an example diagram of communication equipment. The communication equipment includes antenna array 402, amplifier 403, beamformer 406 and transceiver 414. The amplifier 403 is coupled to the antenna array 402, and the beamformer 406 is coupled to the amplifier 403. A transmitter 410 and a receiver 412, which form the transceiver 414, are coupled to the beamformer 406. The transmitter 410 and the receiver 412 could also be coupled to other components, such as other signal processing components which further process received signals or perform processing to generate signals for transmission on a wireless communication link through the antenna array 402, one or more input/output devices, and/or one or more memory devices.

The antenna array 402 includes multiple antenna elements. The antenna elements could take any of a variety of forms, depending on the type of radio equipment. In general, the size of an antenna element is dictated by the wavelength(s) of signals to be received and/or transmitted at the medium (air) interface.

The communication equipment could be communication network equipment or user equipment. In an embodiment, the components are implemented at both communication network equipment and user equipment, to enable communications between the network equipment, such as a base station, and the user equipment.

Each of the amplifiers 403 is coupled to a respective antenna element subunit, each of which may include one or more antenna elements of the antenna array 202. The amplifier could be a low noise amplifier for receiving and a power amplifier for transmitting. The gain of amplifier could be varied, by adding a variable gain amplifier along with low noise amplifier or power amplifier. In one embodiment, each of the amplifiers 403 is coupled to a respective single antenna element. In one embodiment, each amplifier 403 is coupled to multiple antenna elements.

In one embodiment, the beamformer 406 consists of analog phase shifter 404 and controller 405. Each analog phase shifter 404 is coupled to amplifier 403 and then coupled to an antenna element. The beam is formed by adjusting the relative phase difference between each path within a phased array antenna. Beam steering is realized by adjusting the relative phases (and amplifier gain) of each path according to a predetermined table or real-time algorithm, through a controller. Controller 405 could be implemented in hardware, firmware, one or more components that execute software, or some combination thereof. The transmitter 410 and the receiver 412 could be implemented in hardware, firmware, one or more components that execute software, or some combination thereof. Communication equipment need not necessarily support both transmit and receive functions, and therefore in some embodiments only a transmitter 410 or only a receiver 412 might be provided. In another embodiment, beam forming is implemented in baseband, where signals from/to each element antenna are amplified without phase shifting. For receiving, multiple signals are fed into a receiver and combined with phase shifting in the digital domain. For transmitting, the same baseband signals are phase-shifted differently, such that each copy is passed through the transmitter and to the radio front end (e.g., amplifier and antenna).

Implementations of the various components of the example communication equipment could be different for different types of communication equipment. For example, different types of antenna elements could be implemented in the antenna array 402 depending upon whether the communication equipment is user equipment or network equipment. Antenna element numbers and designs could depend not only on the physical space available for the antenna array 402, but also or instead on the frequency at which the antenna elements are to be operated and other characteristics of the wireless communication link(s) that are to be provided. It is also possible that communication equipment could include multiple antenna arrays, for MIMO and diversity operation, for different receive and transmit frequencies or different communication links. Network equipment in an access network, for example, could include different antenna arrays for network-side communication links and access-side communication links. Designs of any of the beamformer 406, the transmitter 410, and the receiver 412 could also be different in different types of communication equipment.

In operation, the transmitter 410 could perform such operations as frequency up-conversion, encoding, and modulation, and the receiver 412 could perform inverse operations, including frequency down-conversion, decoding, and demodulation. Transmitters 410 and receivers 412 could perform other operations instead of or in addition to these example operations, for example beam forming in baseband, depending on the specific implementation and the type(s) of communication functions and protocol(s) to be supported.

In one embodiment, outgoing signals to be transmitted through the antenna array 402 are generated by the transmitter 410 and provided to the beamformer 406, which controls the phase shifts that are applied by the phase controllers 404. The beamformer 406 could also handle distribution of outgoing signals to the phase controllers 404, although this could be handled separately in other embodiments. The phase controllers 404 feed phase shifted transmit signals to the antenna element(s) in the antenna array 202 to which they are coupled.

In the receive direction, signals received at antenna elements of the antenna array 402 are provided to the beamformer 406, which apply phase shifting to the received signals and combine the phase shifted received signals to generate an incoming signal for processing by the receiver 412.

While the general concept of beam steering has been discussed in the context of communication equipment, such as user equipment or network communication equipment, in the context of a communications system, more generally beam steering or beamforming may be implemented in any kind of radio transmitting and/or receiving equipment, for various purposes, such as to align a beam between communicating nodes, to avoid interference from unwanted radio, to scan an illuminating and sensing beam in radar, and to focus a beam in medical RF, for instance.

Figure 5B:
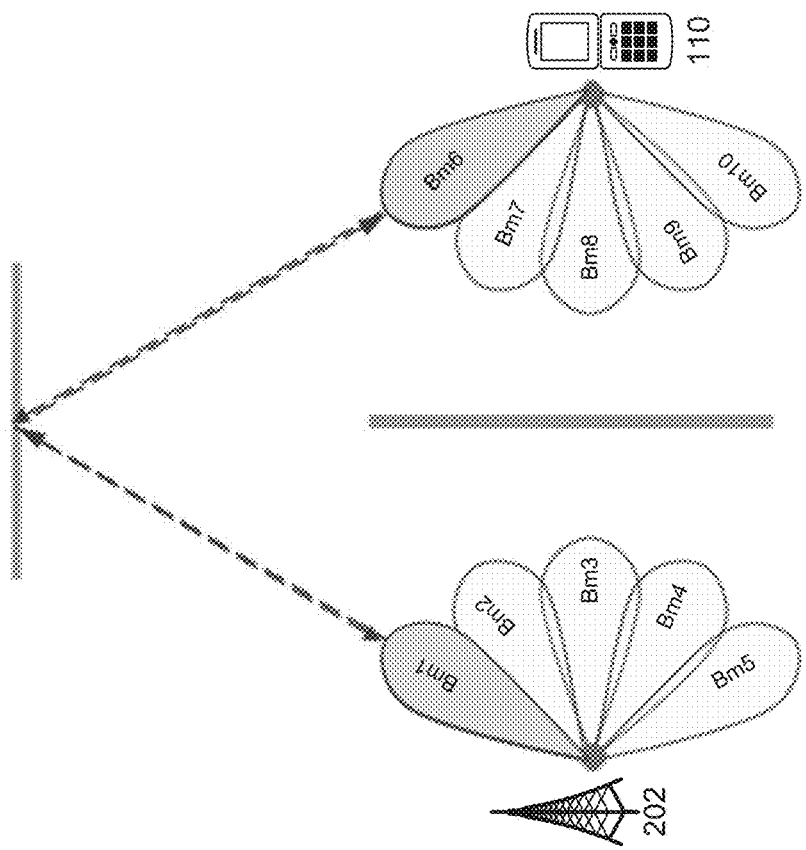
FIGS. 5A and 5B illustrate a beam acquisition and tracking sequence between a base station and user equipment.
Figure 5A:
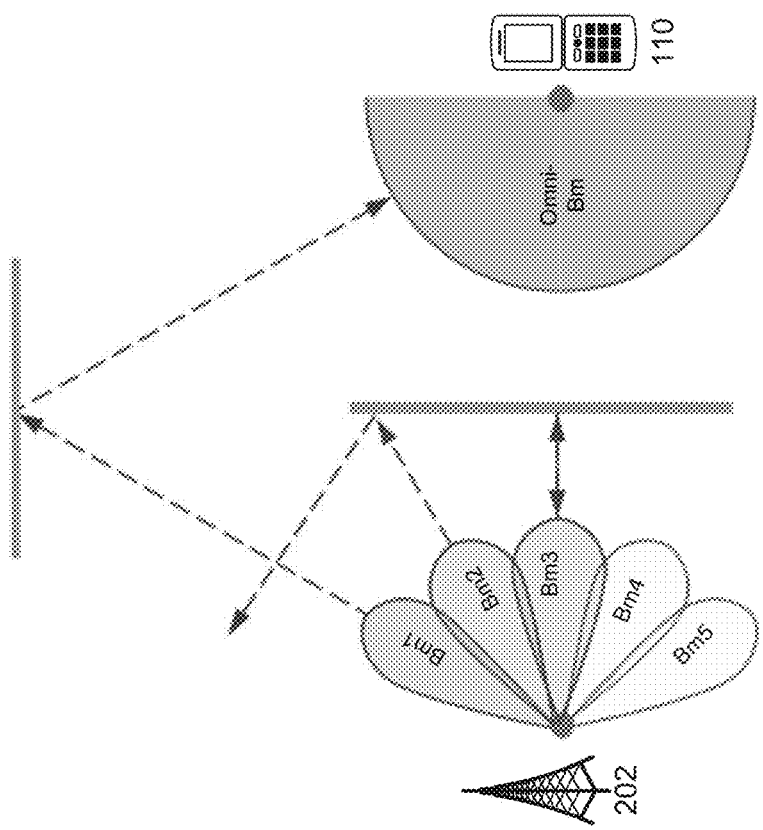

FIGS. 5A-5B illustrate a beam acquisition and tracking sequence between a base station and user equipment. Communication systems, such as those depicted in the example embodiments, using highly directional beams (e.g., mm-wave communication) BM1-BM5 of base station 202 and BM6-BM10 of UE 110 require their beams to be oriented such that they point towards each other. This process is generally referred to as beam acquisition. Beam acquisition establishes the initial beam configuration between corresponding devices (e.g., base station 202 and user equipment 110), enabling them to initiate communications. In a beamformed communication system, the synchronization signals PSS/SSS/PBCH are transmitted to use different beams. In this case, acquisition of the PSS/SSS/PBCH refers to the acquisition of the corresponding beam from base station, as briefly described above.

As shown in FIG. 5A, base station (e.g., gNB 202) may initially transmit directional beams BM1-BM5 which may also be identified as sectors, the beam identification is encoded in the signal. As beams are transmitted by the gNB 202, some may reach the UE 110 while others may be blocked or diverted due to interference. For example, beams BM2 and BM3 are diverted and reflect off of walls in a direction away from the UE 110, while BM1 reflects off of a wall and is diverted to the UE 110. For beams (e.g., BM1) propagating toward sectors in which the UE 110 is located, a UE 110 receives the transmitted beam BM1. In the illustrated example, the beam BM1 is received using an omnidirectional beam antenna (it is appreciated that omnidirectional beam antenna is used for purposes of the example and is non-limiting). If there are more than one beam available from UE side, each beam will be used to identify the beam from the base station. For example, as depicted in FIG. 5B, for each beam (Bm6-Bm10) of UE 110, a transmitter will sweep over all available beams (Bm1-Bm5) before a final beam measurement report is completed.

One embodiment of beam acquisition employs an iterative training scheme. An iterative training process utilizes training sequences and feedback in successive iterations in order to train transmitters or receivers. The iterative training approach provides the advantage of distributing transmit power to multiple power amplifiers, and the beam can be adaptively steered. Other acquisition techniques may also be employed including, but not limited to, an exhaustive search and context information (CI) based search.

In FIG. 5B, the gNB 202 and UE 110 are in beam alignment (as depicted by broken arrows) after the initial acquisition of the signal. However, the initial antenna configuration may be rendered non-optimal due to radio channel condition change and relative motion between the communicating devices sometime after acquisition. Therefore, the optimum pair of beams between the gNB 202 and UE 110 may be improved by being constantly updated based on the received signal quality of various reference signals. This process is called beam tracking and is usually a simpler procedure than initial beam acquisition, with the beam search space restricted to a few candidates that are closely related to the last known optimum beam, as will be described in more detail below.

FIGS. 6A and 6B illustrate an example user device with omnidirectional and directional antennas. As noted with reference to FIG. 5B, communication systems using highly directional beams (e.g., mm-wave) BM1-BM5 of base station 202 and BM6-BM10 of UE 110 require their beams to be oriented such that they point towards each other. However, in deploying such a system, a conflict arises between the ability to conduct fast beam searching and acquisition on the one hand, and better link budget (i.e., accounting of all of the gains and losses from the transmitter, through the transmission medium to the receiver) on the other hand. Fast beam searching and acquisition requires wider beam width (e.g., omnidirectional like antenna pattern), whereas link budget requires higher beam forming gain from phased array antennas (e.g., directional antennas) resulting in narrower beams.

In one embodiment, in order to alleviate the type of conflict described above, multiple phased array antennas with different polarizations are employed in which a single element antenna from each array is utilized to receive beams being transmitted by a transmitter, such as a base station of access point. Each of the single antenna elements in the multiple phased array antennas will exhibit a wider beam width than the collection of all antenna elements in any one phased array antenna. That is, a phased array antenna in which each of (or more than one) the antenna elements are employed will result in a narrower beam width. The single antenna elements selected from each of the multiple phased array antennas may then be combined (e.g., connecting the selected single antenna elements from each phased array to form a uniform antenna array) in order to form a connected set of antennas. In one embodiment, selection of the single antenna element from a phased array antenna may be random, preconfigured or dynamic. In one embodiment, the connected set of antennas provides a relatively flat 360 degree spherical (e.g., omnidirectional or quasi-omnidirectional) coverage. For example, user device 110 may employ dipole antennas radiating dipole antenna patterns 112A and 112B and patch antennas radiating patch antenna patterns 114A and 114B.

With reference to FIG. 6A, a top view of a user device is illustrated in which phased array antennas are employed. As depicted, two dipole antennas respectively radiate dipole antenna patterns 112A and 112B. Dipole antennas are one type of omnidirectional antennas that radiate radio wave power uniformly in all directions in one plane, with the radiated power decreasing with elevation angle above or below the plane, and dropping to zero on the antenna's axis.

A dipole antenna most commonly refers to a half-wavelength ($\lambda/2$) dipole. The physical antenna is constructed of conductive elements whose combined length is about half of a wavelength at its intended frequency of operation. The antenna radiates energy outward toward the horizon (perpendicular to the antenna).

Figure 7A:
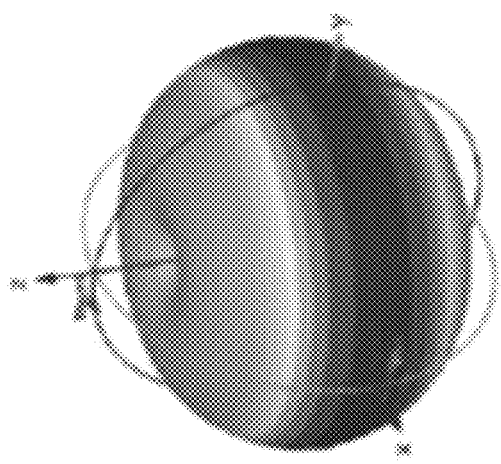
FIGS. 7A-7B illustrate example radiation and elevation plane patterns of the devices in FIGS. 6A and 6B.
Figure 7B:
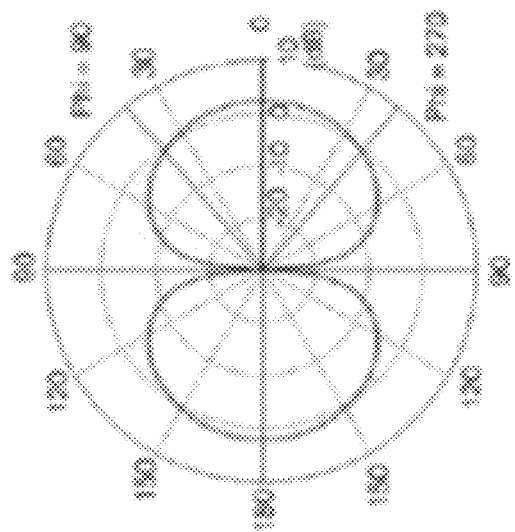

The radiation patterns shown in FIGS. 7A and 7B are those resulting from a dipole antenna formed with two thin wires oriented vertically along the z-axis. The resulting 3D radiation pattern, as shown in FIG. 7A, appears like a donut or a bagel with the antenna sitting in the hole and radiating energy outward. The strongest energy is radiated outward, perpendicular to the antenna in the x-y plane.

The elevation plane radiation pattern, as shown in FIG. 7B, is formed by slicing the 3D radiation pattern through an orthogonal plane (either the x-z plane or the y-z plane). From the elevation plane radiation pattern, the dipole antenna has an elevation plane beamwidth of 78-degrees, as indicated on the radiation pattern by the two solid lines (ending at Phi=90 and Phi=270). These lines are drawn where the gain is down from the peak by 3-dB. The elevation plane beamwidth is the total angular width between the two 3-dB points on the curve.

In the depicted example, the gain of the half-wave dipole is approximately 2.2 dBi. The value of 2.2 dBi is achieved at the horizon in the elevation plane and everywhere in the azimuth plane. Note that the azimuth plane pattern is a circle passing through the gain value of 2.2 dBi at all angles. These values are the 3-dB beamwidth and gain of a theoretical half-wave dipole.

Figure 8A:
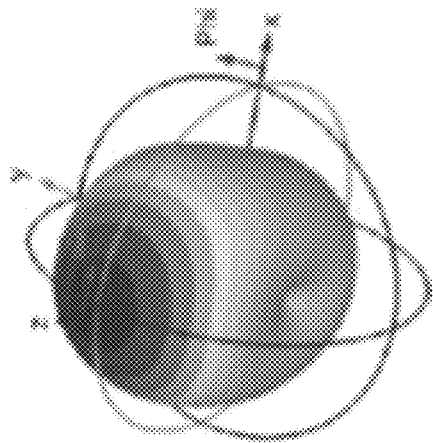
FIGS. 8A and 8B illustrate example radiation and elevation plane patterns of the devices in FIGS. 6A and 6B.
Figure 8B:
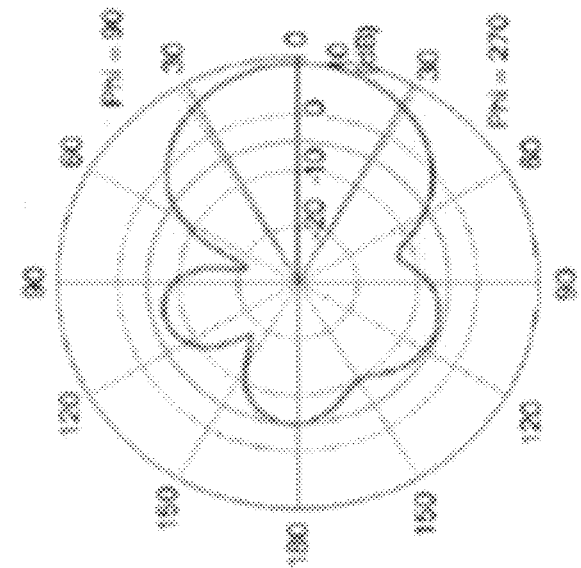

Turning to FIG. 6B, a side view of a user device is illustrated in which a phased array antenna is employed. As depicted, patch antennas respectively radiates patch antenna patterns 114A and 114B. A patch antenna is one type of directional antenna used for coverage, as well as point-to-point links, by radiating energy out in a particular direction. The radiation patterns shown in FIGS. 8A and 8B are those resulting from a patch antenna.

As appreciated, a patch antenna is a single rectangular (or circular) conductive plate that is spaced above a ground plane. The radiation pattern of a single patch is characterized by a single main lobe of moderate beamwidth with shallow nulls pointing up and down from the antenna, as illustrated in FIG. 8A. Frequently, the beamwidths in the azimuth and elevation planes are similar, resulting in a fairly circular beam. However, the beamwidths can be manipulated to produce an antenna with higher or lower gain, depending on the requirements. An antenna built with a single patch will have a maximum gain of about 9 dBi or slightly less. The patch antenna in FIG. 6B is designed to have higher gain rather than symmetrical plane patterns. Accordingly, the gain is about 8.8 dBi with an azimuth plane beamwidth of 70 degrees and an elevation plane beamwidth of 57 degrees, as depicted in FIG. 8B. The beam width can be widened at the cost of less gain. For example, a patch antenna with 5 dBi gain is a good tradeoff between beam width and gain.

Patch antennas may also be in the form of a patch array antenna in which multiple antenna elements are employed. Frequently, this arrangement consists of patches arranged in orderly rows and columns (a rectangular array) to provide higher gain and a narrower beamwidth. Since the dipole antenna is null along the axis (Phi=90/270), another antenna such as a patch can be used together to achieve omnidirectional coverage.

Although the illustrated embodiments are referenced with respect to dipole and patch antennas, it is appreciated that the user device is not limited to dipole and patch antennas and that any variety of well-known antennas or antenna arrays may also be employed to achieve the same or similar results.

Figure 9:
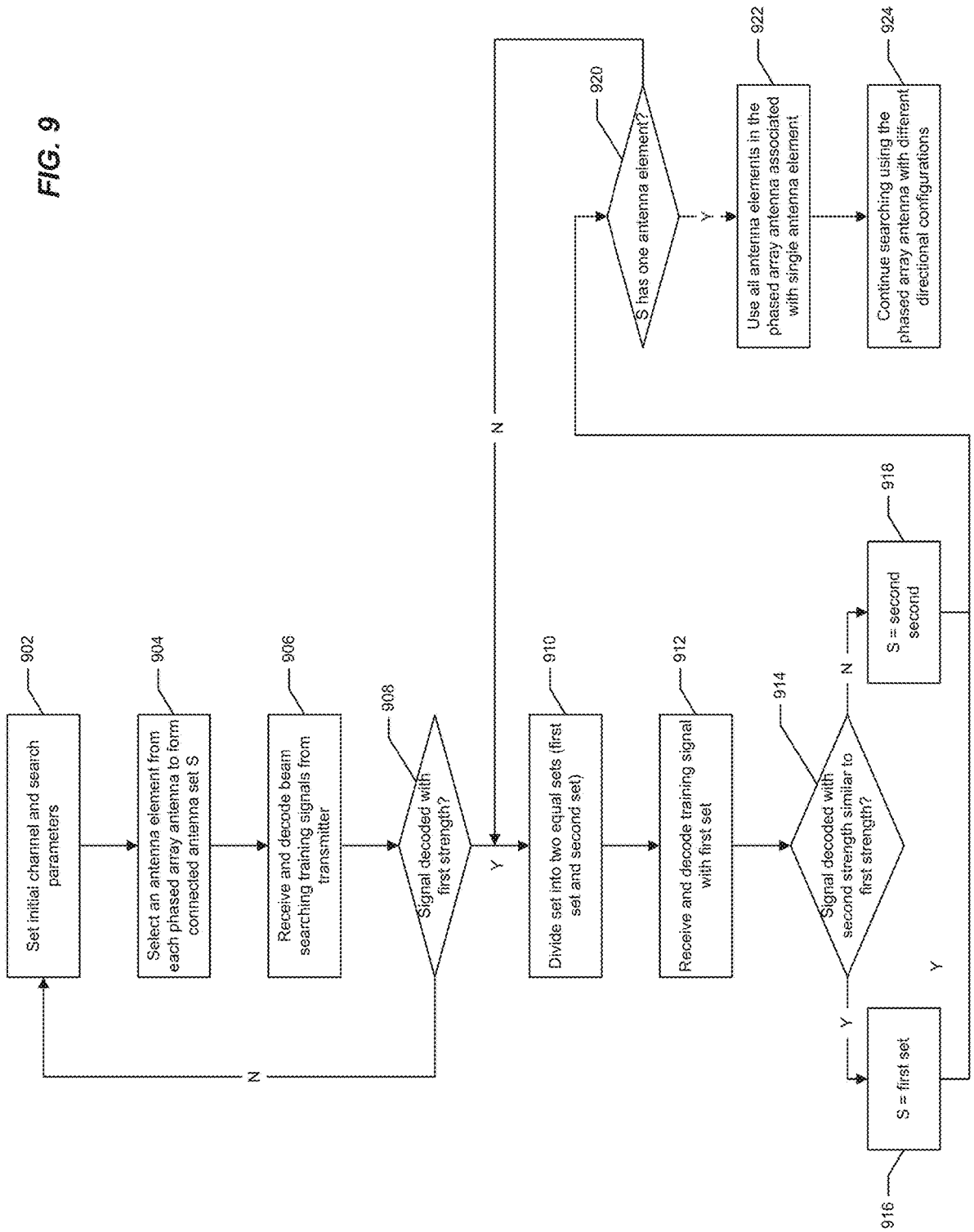
FIG. 9 illustrates a flow diagram of beam searching using a binary search in accordance with the disclosed embodiments.

FIG. 9 illustrates a flow diagram of beam searching using a binary search in accordance with the disclosed embodiments. In the disclosed embodiment, the procedures are implemented by user equipment, such as user equipment 110, or a base station, such as base station 202. However, it is appreciated that any of the components in FIGS. 1, 2, 6A, 6B, 10A, 10B and 11 may be employed to implement the procedures.

As detailed above, phased array antennas are used in mm-wave communication to achieve higher gain. However, each phased array has limited coverage (directional). Typically, multiple phased array antennas are required to provide spherical coverage from all directions. Moreover, a link is maintained between a transmitter (e.g., base station) and receiver (e.g., user equipment) for beam searching and alignment procedures in a communication system. Maintaining the link between devices in a mobile communication system is complicated by the mobility of the user equipment (e.g., mobile devices), which requires the user equipment to constantly track and search for the best beam (beam with the strongest signal), as well as align itself to the best beam. Accordingly, the beam searching and alignment procedures are of critical importance in providing efficient communication and reducing costs.

Embodiments of the disclosure use a single (e.g., one or respective one) antenna element from a phased antenna, as opposed to all antenna elements, to form an antenna pattern that is wider than a beam formed pattern. A single antenna element from each phased array antenna is connected together (forming a connected set) to thereby form the uniform antenna array. In one embodiment, the single antenna elements from each phased array antenna are physically connected together to for the connected set. In one embodiment, the physical connection may be realized by a dividing or combining circuit. For example, the Rx signal may be received by an element antenna, where each element antenna array is connected to Tx/Rx switch, LNA, a phase shifter, etc., then to a power divider/combiner and to a transceiver (VGA/Mixer/VGA/ADC). The combination of signals from each element antenna could be realized in an analog domain by a power combiner or in a digital domain, by maximum ratio combining or a result of combining independently processed signals. In one embodiment, the phased array antennas are non-overlapping.

As a result of the uniform pattern, the antenna array in the receiver will receive signals from all directions from the transmitter with a relatively flat antenna gain. The received signal strengths may be measured and used to obtain the best beam from transmitter. In one embodiment, each phased array antenna has the same number of element antennas, where the array gain is the same for each element antenna. The signal strength from a single element antenna is a good indication of the best achievable signal strength from the beamformed array. In another embodiment, each phased array antenna may have a different number of element antennas, where the array gain is different for the different antennas. The array gain difference may be added during the evaluation of the best beam from transmitter. After the best beam from transmitter is identified, a binary search of the antenna elements yielding the same signal strength (compared to uniform antenna array) will be performed to determine the phased antenna array receiving the best beam. A detailed description of the procedure follows.

At 902, initial channel and search parameters are set by initiating a search operation to find available transmitters and communication channels and by performing a synchronization operation to synchronize the receiver with the transmitter. In a beamformed communication system, the transmitter will periodically send out a training beam for each supported direction. Each training beam will contain the information for further access to the system, such as bandwidth, timing, frame structure, network ID, etc. In one embodiment, initial access to a communication network by a receiver (user equipment) involves a search operation to find available transmitters (base stations) and communication channels and a synchronization operation to synchronize the user equipment to the base station. Dedicated physical signal such as Primary Synchronization Signal (PSS), Secondary Synchronization Signal (SSS), or dedicate physical channels, such as a downlink initial access channel (IACH) and a synchronization channel (SCH) for timing and frequency synchronization are used.

A single antenna element is selected from each of the phased array antennas to form a connected set of antennas (antenna set S) at 904. The signals received by this set of element antennas will be combined in analog domain or digital domain and processed, to achieve synchronization in frequency and time domain, to decode the information coded in the training beam. As described above, the antenna set S includes a single antenna element from each of the multiple phased array antennas in the receiver. By connecting the single antenna elements to form a connected antenna set S, a uniform (omnidirectional like) antenna array is formed in which the initial search for a best beam from the transmitter may be performed.

At 906, beams received at the user equipment from the transmitter are decoded. The successful decoding of the received signal will provide the identification of the received beam from the transmitter. That is, the user equipment receives a series of training beams in a training cycle from the transmitter which are decoded by the user equipment upon receipt. and the default training beam cycle is defined by protocol as a shared information; the training beam cycles could be revised by signaling from base station. Within each cycle, different beams toward different directions will be transmitted once. Signal strength or quality are often measured to find the best beam from base station. For example, received signal strength indicator (RSSI), reference signal received power (RSRP) or reference signal received quality (RSRQ) may be used to measure signal strength and quality. The signal strength of each training beam is measured to identify the beam with the strongest signal (e.g., highest signal strength) at 908, where the strongest signal is denoted as R0, the first signal strength. The strongest signal R0, of the received beams is recorded and reported as the beam with highest signal strength to the transmitter. If no signal can be decoded within a predetermined time (e.g., the periodicity of the beam training signal) as determined at 908, the procedure returns to 902. A different channel and other search parameter will be set. Otherwise, the procedure proceeds to 910.

At 910, the binary search portion of the procedure is initiated by dividing the antenna elements in the connected set (S) of the phased array antenna of the receiver into two equal sets. That is, after each division, half of the previous antennas are used, and the other half are disconnected. In one embodiment, the antenna elements are divided into two unequal sets. Within a beaming training cycle, the user equipment will go through the receiving and decoding procedure for the training transmit beam. For a system with N phased array antennas, the total searching time will be log 2(N) training beam cycles. For example, assume for purposes of discussion that a device has eight phased array antennas. If a single antenna element is selected from each of the eight phased array antenna (at 904), there are eight antenna elements that form the original connected set S (uniform antenna array). In the dividing step at 910, the connected set S is divided into two equal sets, namely, a first set with four antenna elements and second set with four antenna elements. The searching will proceed until one element antenna is in a set. The searching time in this example will be log 2(8) cycles. In one embodiment, when log 2(N) is not an integer, the searching cycle is round to next integer bigger than log 2(N).

At the end of the beam training cycle, antenna elements will be divided into the first and second sets, the user equipment receives another series of training beams from the transmitter which are decoded by the user equipment using the antenna elements in the first set at 912. The signal strength of each training beam is measured to identify the beam with the strongest signal (e.g., highest signal strength), where the strongest signal is denoted as R1 with the same beam identification as the previous strongest beam.

At 914, the strongest signal R1 is compared to the strongest signal R0 previously recoded. If the strongest signal R1 is equal to R0, then the second set of antenna elements is discarded (or disconnected) from the active antenna array. In this case, the connected set S becomes the first set at 916. In one embodiment, the strongest signal R1 is identified as being similar to approximately the same as strongest signal R0 as determined to be within a particular threshold or measurement error or variation.

If the strongest signal R1 is smaller than R0 (e.g. R1 is less than R0 and outside of any threshold or measured error or variation), then the first set of antenna elements is discarded (or disconnected) from the array antenna. In this case, the connected set S becomes the second set at 918. Otherwise, if R1 is greater than R0 (an indication of channel change), the first set can be kept as connected set.

At 920, it is determined whether the connected set S has a single (one) antenna element or more remaining. For instance, and following the example above, after dividing the connected set into two equal parts, the first and second set each have four antenna elements remaining. In the case where more than one antenna element remains, the binary search process is repeated, beginning at 910, where the connected antenna set S (in the second iteration of the foregoing example, the connected antenna set S has three antennas) is divided until a single antenna element remains in either the first or second connected set S. Once all iterations of the binary search process has been completed, the single antenna element remaining in either the first or second connected set S belongs to the array antenna yielding the highest gain from the user equipment (receiver). This phased array antenna will generate the best beam from the user equipment. The procedure continues to 922.

In another embodiment, where multiple stronger transmit beams (e.g., beams with a quasi-omnidirectional pattern) are to be searched and reported, the beams are identified by their specific beam identification number. This identification is encoded in the transmitted training beam signal. In this case, the searching is conducted with respect to each beam identification, and the signal strength for each beam is compared for each receive beam configuration, i.e., the configuration of each connected antenna set. Typically, a limited number of transmit training beams may be required to search and report, for example 1, 2 or 4. The searching is performed sequentially with the identified transmit beam ID, i.e, the signal strength for that specific beam ID are used in the comparison and determination of the connected antenna set.

The phased array antenna with the remaining antenna element (single antenna element) is enabled such that all (or at least more than the single antenna element) of the antenna elements in the phased array antenna are enabled (i.e., activated) for beam alignment at 922, and, at 924, the antenna elements in the phased array antenna searches for beams using different directional configurations for beam refinement. The enabling of an antenna elements may be realized by switching or enabling the amplifier circuits (e.g., LNA/PA). In one embodiment, the antenna elements are initially set to form a beam to cover a first half of the spherical space that the phased array is intended to cover, and the search is executed over the transmit training beam. If the strongest Tx beam is either aligned with the training beam or in the remaining (second) half of the spherical space, another transmit training beam with half of the previous beam width will be configured either in the current training beam range or the remaining training beam range, depending on the search result. This will be repeated until the narrowest achievable beam is formed.

In one alternative embodiment, each available beam from the receiver is used to decode training signals from a corresponding beam of an antenna element in the transmitter. During the beam search, the transmitter can acquire and align the beam from the transmitter and receiver with an added cost of a longer search time. Once the beam is decoded, the UE will be able to find the initial starting point of the beam training cycle. For each transmit training beam cycle, one receive beam configuration will be used. After exhausting the possible receive beam configurations, the overall signal strength will be compared to identify the transmit beam and the corresponding receive beam. For example, for user equipment with six phased array antennas, where each phased array antenna is preconfigured to form eleven beams, the total search will be sixty-six training beam cycles. Employing the binary search technique disclosed herein, the training beam cycles will be reduced to seven (three for the phased array antenna search and four for beam search within an phased array antenna).

Figure 10A:
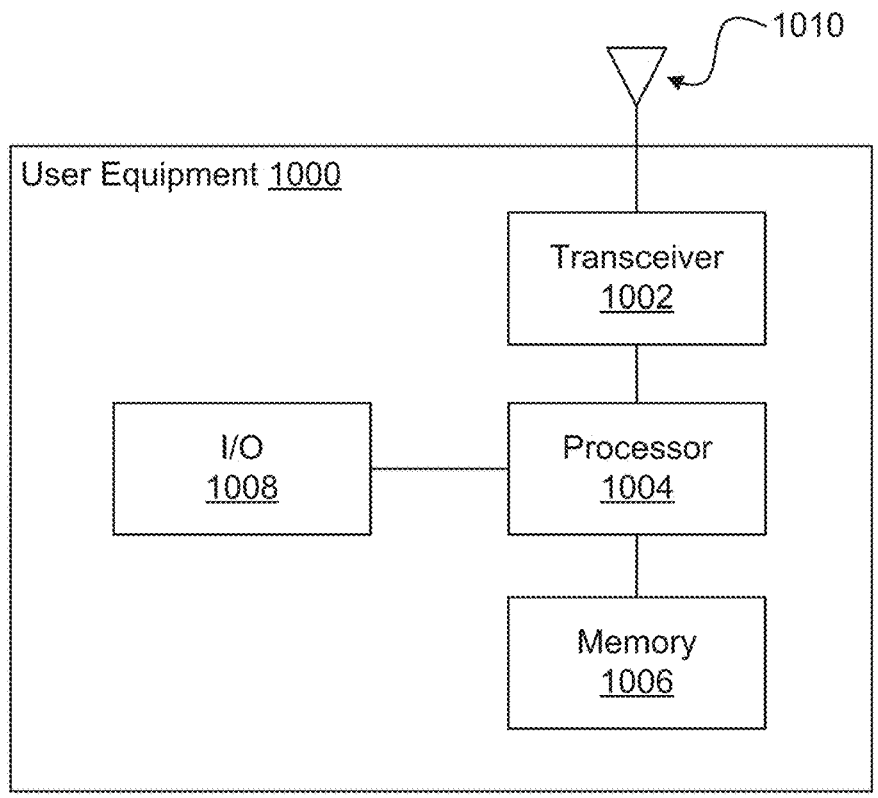
FIG. 10A illustrates example user equipment that may implement the methods and teachings according to this disclosure.

FIG. 10A illustrates example user equipment that may implement the methods and teachings according to this disclosure. As shown in the figure, the UE 1000 includes at least one processor 1004. The processor 1004 implements various processing operations of the UE 1000. For example, the processor 1004 may perform signal coding, data processing, power control, input/output processing, or any other functionality enabling the UE 1000 to operate in the system 100 (FIG. 1). The processor 1004 may include any suitable processing or computing device configured to perform one or more operations. For example, the processor 1004 may include a microprocessor, microcontroller, digital signal processor, field programmable gate array, or application specific integrated circuit.

The UE 1000 also includes at least one transceiver 1002. The transceiver 1002 is configured to modulate data or other content for transmission by at least one antenna 1010. The transceiver 1002 is also configured to demodulate data or other content received by the at least one antenna 1010. Each transceiver 1002 may include any suitable structure for generating signals for wireless transmission and/or processing signals received wirelessly. Each antenna 1010 includes any suitable structure for transmitting and/or receiving wireless signals. It is appreciated that one or multiple transceivers 1002 could be used in the UE 1000, and one or multiple antennas 1010 could be used in the UE 1000. Although shown as a single functional unit, a transceiver 1002 may also be implemented using at least one transmitter and at least one separate receiver.

The UE 1000 further includes one or more input/output devices 1008. The input/output devices 1008 facilitate interaction with a user. Each input/output device 1008 includes any suitable structure for providing information to or receiving information from a user, such as a speaker, microphone, keypad, keyboard, display, or touch screen.

In addition, the UE 1000 includes at least one memory 1006. The memory 1006 stores instructions and data used, generated, or collected by the UE 1000. For example, the memory 1006 could store software or firmware instructions executed by the processor(s) 1004 and data used to reduce or eliminate interference in incoming signals. Each memory 1006 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

Figure 10B:
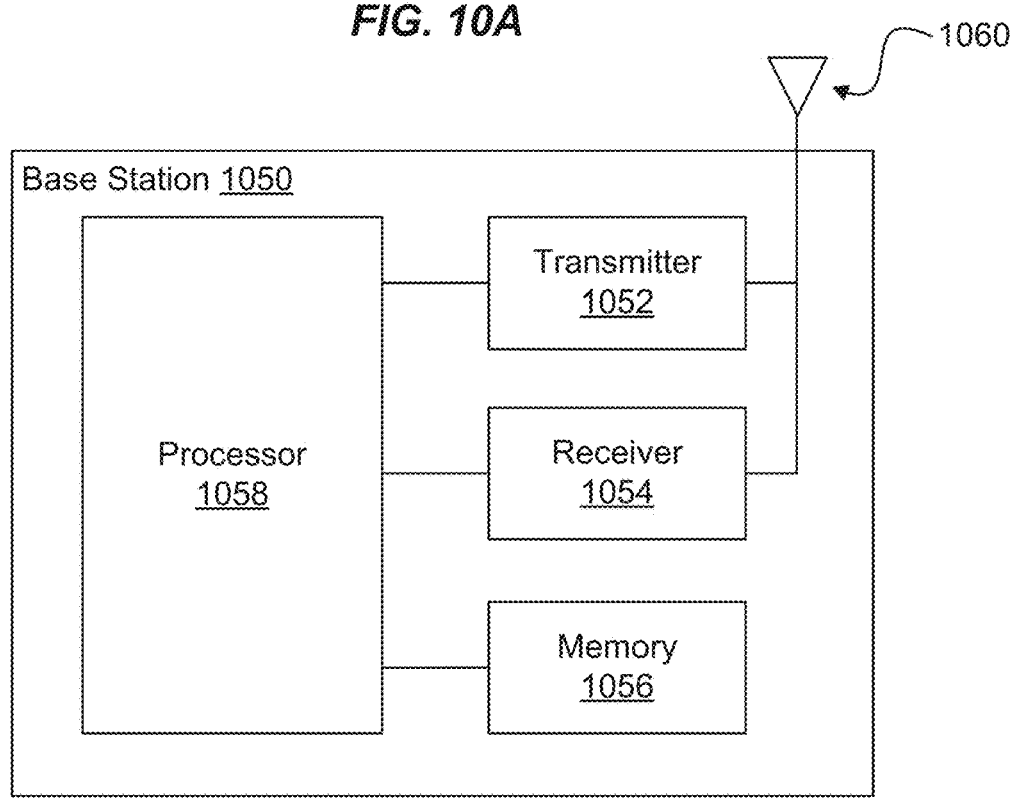
FIG. 10B illustrates example base station that may implement the methods and teachings according to this disclosure.

FIG. 10B illustrates example base station that may implement the methods and teachings according to this disclosure. As shown in the figure, the base station 1050 includes at least one processor 1058, at least one transmitter 1052, at least one receiver 1054, one or more antennas 1060, and at least one memory 1056. The processor 1058 implements various processing operations of the base station 1050, such as signal coding, data processing, power control, input/output processing, or any other functionality. Each processor 1058 includes any suitable processing or computing device configured to perform one or more operations. Each processor 1058 could, for example, include a microprocessor, microcontroller, digital signal processor, field programmable gate array, or application specific integrated circuit.

Each transmitter 1052 includes any suitable structure for generating signals for wireless transmission to one or more UEs or other devices. Each receiver 1054 includes any suitable structure for processing signals received wirelessly from one or more UEs or other devices. Although shown as separate components, at least one transmitter 1052 and at least one receiver 1054 could be combined into a transceiver. Each antenna 1060 includes any suitable structure for transmitting and/or receiving wireless signals. While a common antenna 1060 is shown here as being coupled to both the transmitter 1052 and the receiver 1054, one or more antennas 1060 could be coupled to the transmitter(s) 1052, and one or more separate antennas 1060 could be coupled to the receiver(s) 1054. Each memory 1056 includes any suitable volatile and/or non-volatile storage and retrieval device(s).

Figure 11:
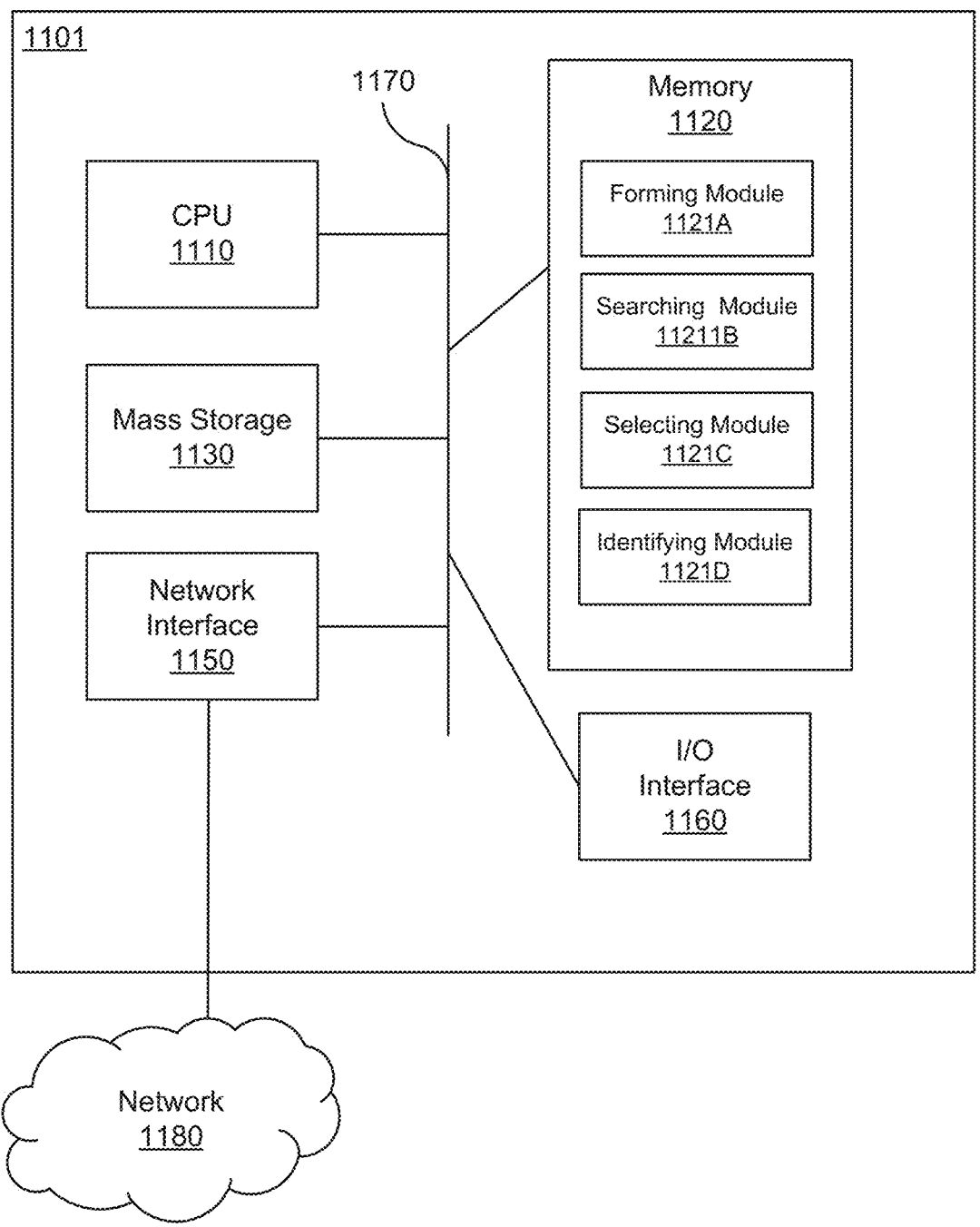
FIG. 11 illustrates a block diagram of a network system that can be used to implement various embodiments.

FIG. 11 is a block diagram of a network device that can be used to implement various embodiments. Specific network devices may utilize all of the components shown, or only a subset of the components, and levels of integration may vary from device to device. Furthermore, the network device 1100 may contain multiple instances of a component, such as multiple processing units, processors, memories, transmitters, receivers, etc. The network device 1100 may comprise a processing unit 1101 equipped with one or more input/output devices, such as network interfaces, storage interfaces, and the like. The processing unit 1101 may include a central processing unit (CPU) 1110, a memory 1120, a mass storage device 1130, and an I/O interface 1160 connected to a bus 1170. The bus 1170 may be one or more of any type of several bus architectures including a memory bus or memory controller, a peripheral bus or the like.

The CPU 1110 may comprise any type of electronic data processor. The memory 1120 may comprise any type of system memory such as static random access memory (SRAM), dynamic random access memory (DRAM), synchronous DRAM (SDRAM), read-only memory (ROM), a combination thereof, or the like. In an embodiment, the memory 1120 may include ROM for use at boot-up, and DRAM for program and data storage for use while executing programs. In embodiments, the memory 1320 is non-transitory. In one embodiment, the memory 1320 includes a forming module 1321A forming an omnidirectional radiation pattern by a combination of antenna elements, the combination including a single antenna element from each of one or more phased array antennas, an searching module 1321B searching for one antenna element in the combination according to a signal strength of each antenna element in the combination, a selecting module 1321C selecting a first set of the two equal sets when the signal strengths are equal and selecting a second set of the two equal sets when the signal strength of the one antenna in the two equal sets is lower than the signal strength of the one antenna in the combination, and an identifying module 1321D identifying a direction of the beams from the transmitter using a binary search of the single antenna element from each of the one or more phased array antennas. The mass storage device 1130 may comprise any type of storage device configured to store data, programs, and other information and to make the data, programs, and other information accessible via the bus 1170. The mass storage device 1130 may comprise, for example, one or more of a solid state drive, hard disk drive, a magnetic disk drive, an optical disk drive, or the like.

The processing unit 1101 also includes one or more network interfaces 1150, which may comprise wired links, such as an Ethernet cable or the like, and/or wireless links to access nodes or one or more networks 1180. The network interface 1150 allows the processing unit 1101 to communicate with remote units via the networks 1180. For example, the network interface 1150 may provide wireless communication via one or more transmitters/transmit antennas and one or more receivers/receive antennas. In an embodiment, the processing unit 1101 is coupled to a local-area network or a wide-area network for data processing and communications with remote devices, such as other processing units, the Internet, remote storage facilities, or the like.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications and equivalents of these embodiments, which are included within the scope and spirit of the subject matter as defined by the appended claims. Furthermore, in the following detailed description of the present subject matter, numerous specific details are set forth in order to provide a thorough understanding of the present subject matter. However, it will be clear to those of ordinary skill in the art that the present subject matter may be practiced without such specific details.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

The computer-readable non-transitory media includes all types of computer readable media, including magnetic storage media, optical storage media, and solid state storage media and specifically excludes signals. It should be understood that the software can be installed in and sold with the device. Alternatively the software can be obtained and loaded into the device, including obtaining the software via a disc medium or from any manner of network or distribution system, including, for example, from a server owned by the software creator or from a server not owned but used by the software creator. The software can be stored on a server for distribution over the Internet, for example.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of beam searching, comprising:
    forming an omnidirectional radiation pattern by a group of antenna elements including one antenna element from each of one or more phased array antennas;
    receiving beams from a transmitter;
    searching for one antenna element in the group according to a combination of signal strength of the beams for each antenna element in the group; and
    aligning a phased array antenna, including the one antenna element, with the beams.

2. The method of claim 1, wherein the search is based on a binary search operation.

3. The method of claim 2, wherein the binary search operation comprises
    recording a first signal strength of the group of antenna elements;

dividing the group of antenna elements into two sets of antenna elements; and
comparing the first signal strength with a second signal strength with each antenna element in one of the two sets; and
determining one set of the antenna elements based on the comparison, wherein the determined set contains the one antenna element.

4. The method of claim 3, wherein the binary search further comprises:
selecting a first set of the two sets when the signal strengths are equal;
selecting a second set of the two sets when the second signal strength is lower than the first signal strength; and
aligning the phased array antenna, including the one antenna element, with the beams when one of the antenna elements remains in one of the first and second sets.

5. The method of claim 4, wherein the first set includes half of the antenna elements of the one or more phased array antennas, and the second set includes the other half of the antenna elements of one or more phased array antennas.

6. The method of claim 3, further comprising
initiating a search operation to find available transmitters and communication channels and a synchronization operation to synchronize with the transmitter; and
selecting the one antenna element from each of the one or more phased array antennas.

7. The method of claim 3, the method further comprising, after searching for the one antenna element in the two sets, activating each of the antenna elements in the phased array antenna with the one antenna element.

8. The method of claim 3, wherein the one or more phased array antennas have a searching time of log 2(N), where N is a number of the one or more phased array antennas.

9. A device for beam searching, comprising:
one or more phased array antennas forming an omnidirectional radiation pattern by a group of antenna elements including one antenna element from each of one or more phased array antennas;
a receiver configured to receive beams from a transmitter;
a controller controlling the one or more phased array antennas to:
search for one antenna element in the group according to a combined signal strength of the beams for each antenna element in the group, and
align a phased array antenna, including the one antenna element, with the beams.

10. The device of claim 9, wherein the search is based on a binary search operation.

11. The device of claim 10, wherein the binary search operation comprises
recording a first signal strength of the group of single antennas;
dividing the group of antenna elements into two sets of antenna elements; and
comparing the first signal strength with a second signal strength with each antenna element in one of the two sets; and
determining one set of the antenna elements based on the comparison, wherein
the determined set contains one antenna element.

12. The device of claim 11, wherein the binary search operation further comprises:
selecting a first set of the two sets when the signal strengths are equal;
selecting a second set of the two sets when the second signal strength is lower than the first signal strength; and
aligning the phased array antenna, including the one antenna element, with the beams when one of the antenna elements remains in one of the first and second sets.

13. The device of claim 12, wherein the first set includes half of the antenna elements of the one or more phased array antennas, and the second set includes the other half of the antenna elements of one or more phased array antennas.

14. The device of claim 11, further comprising
initiating a search operation to find available transmitters and communication channels and a synchronization operation to synchronize with the transmitter; and
selecting the one antenna element from each of the one or more phased antennas.

15. The device of claim 11, wherein, after searching for the one antenna element in the two sets, the controller further controlling the one or more phased array antennas to activate each of the antenna elements in the phased array antenna with the one antenna element.

16. The device of claim 11, wherein the one or more phased array antennas have a searching time of log 2(N), where N is a number of the one or more phased array antennas.

17. A non-transitory computer-readable medium storing computer instructions for beam searching, that when executed by one or more processors, cause the one or more processors to perform the steps of:
forming an omnidirectional radiation pattern by a group of antenna elements including one antenna element from each of one or more phased array antennas;
receiving beams from a transmitter;
searching for one antenna element in the group according to a combined signal strength of the beams for each antenna element in the group; and
aligning a phased array antenna, including the one antenna element with the beams.

18. The non-transitory computer-readable medium of claim 17, wherein the search is based on a binary search operation.

19. The non-transitory computer-readable medium of claim 18, wherein the binary search causes the one or more processors to perform the additional steps of:
recording a first signal strength of the group of antenna elements;
dividing the group of antenna elements into two sets of antenna elements;
comparing the first signal strength with a second signal strength with each antenna element in one of the two seats; and
determining one set of the antenna elements based on the comparison, wherein
the determined set contains one antenna element.

20. The non-transitory computer-readable medium of claim 19, wherein the binary search further causes the one or more processors to perform the additional steps of:
selecting a first set of the two sets when the signal strengths are equal;
selecting a second set of the two sets when the second signal is lower than the first signal; and
aligning the phased array antenna, including the one antenna element, with the beams when one of the antenna elements remains in one of the first and second sets.

21. The non-transitory computer-readable medium of claim 17, wherein the combined signal strength is the strongest signal strength among the decoded beams.

22. The non-transitory computer-readable medium of claim 17, wherein the combined signal strength is identifiable by information coded within the beams.

* * * * *

UNITED STATES PATENT AND TRADEMARK OFFICE
CERTIFICATE OF CORRECTION

PATENT NO. : 10,827,364 B2
APPLICATION NO. : 15/896993
DATED : November 3, 2020
INVENTOR(S) : Shi et al.

It is certified that error appears in the above-identified patent and that said Letters Patent is hereby corrected as shown below:

On the Title Page

Page 2, Column 1, Line 7: please replace "Mehrabani" with --Mehrabani et al.--

Signed and Sealed this
Twenty-fourth Day of May, 2022

Katherine Kelly Vidal
*Director of the United States Patent and Trademark Office*